(12) United States Patent
Smart et al.

(10) Patent No.: US 6,184,531 B1
(45) Date of Patent: Feb. 6, 2001

(54) APPARATUS FOR REAL-TIME AIRBORNE PARTICULATE RADIONUCLIDE COLLECTION AND ANALYSIS

(75) Inventors: John E. Smart, West Richland; Richard W. Perkins, Richland, both of WA (US)

(73) Assignee: Battelle Memorial Institute, Richland, WA (US)

( * ) Notice: Under 35 U.S.C. 154(b), the term of this patent shall be extended for 0 days.

(21) Appl. No.: 09/062,361

(22) Filed: Apr. 17, 1998

(51) Int. Cl.[7] .................................................. G01T 1/24
(52) U.S. Cl. .................................. 250/370.01; 250/253
(58) Field of Search .................... 250/370.02, 370.01, 250/435, 253

(56) References Cited

U.S. PATENT DOCUMENTS

| | | | |
|---|---|---|---|
| 3,555,278 | * 1/1971 | Schroeder | 250/304 |
| 4,464,574 | * 8/1984 | Vandrish | 250/432 PD |
| 4,571,492 | * 2/1986 | Kane et al. | 250/303 |
| 4,808,827 | * 2/1989 | Woollman | 250/370.02 |

\* cited by examiner

*Primary Examiner*—Constantine Hannaher
(74) *Attorney, Agent, or Firm*—Paul W. Zimmerman (57) ABSTRACT

An improved apparatus for collecting and analyzing an airborne particulate radionuclide having a filter mounted in a housing, the housing having an air inlet upstream of the filter and an air outlet downstream of the filter, wherein an air stream flows therethrough. The air inlet receives the air stream, the filter collects the airborne particulate radionuclide and permits a filtered air stream to pass through the air outlet. The improvement which permits real time counting is a gamma detecting germanium diode mounted downstream of the filter in the filtered air stream. The gamma detecting germanium diode is spaced apart from a downstream side of the filter a minimum distance for a substantially maximum counting detection while permitting substantially free air flow through the filter and uniform particulate radionuclide deposition on the filter.

39 Claims, 10 Drawing Sheets

APPARATUS FOR REAL-TIME AIRBORNE PARTICULATE RADIONUCLIDE COLLECTION AND ANALYSIS

This invention was made with Government support under Contract DE-AC06-76RLO 1830 awarded by the U.S. Department of Energy. The Government has certain rights in the invention.

FIELD OF THE INVENTION

The present invention is related to airborne particulate radionuclide collection and analysis.

BACKGROUND OF THE INVENTION

Airborne particulate radionuclide(s) result from natural sources as well as man made sources, for example releases from nuclear power plants, nuclear testing, and weapon detonation. Public health and safety as well as treaty verification have motivated the need for more accurate analysis to identify sources as well as characterize airborne plumes.

Present methods include, for example aircraft mounted filter elements wherein a filter element is placed external to the aircraft while the aircraft is flying thereby filtering that portion of air that passes through the filter element and collecting a sample of the airborne radionuclide(s). The filter with collected sample is returned to a laboratory for gamma spectrometric counting and other analysis. The advantage of this method is that the delay between sample collection and sample counting and analysis permits any radon to decay thereby permitting greater sensitivity to the non-radon radionuclide(s) in the sample. The disadvantage is that by the time the counting and analysis is done, the airborne plume has likely changed significantly so that the analysis no longer characterizes the plume. In addition, delayed laboratory analysis is unable to detect small quantities of some short-lived radionuclides that may be important to treaty verification. Another disadvantage is the limited sensitivity imposed by natural atmospheric radionuclides including radon and radon decay products or daughters. Rn-222 (3.82 d, 10 Bq/m$^3$ atmospheric concentration) is continuously released from the earth's crust as a decay product of natural uranium. Rn-220 (55 s, 1% of total atmospheric radionuclide concentration) is also continuously released from the earth's crust as a decay product of naturally occurring thorium. Cosmic rays spallate atmospheric nitrogen, oxygen and argon and produce Be-7 (53.28 d). Anthropogenic sources generally contribute less than 1% of the airborne radionuclide concentration in the atmosphere. Present techniques simply lack adequate sensitivity to resolve signals of natural and anthropogenic sources.

Thus, there is a need for a real time analysis of airborne radionuclides so that plume characteristics may be properly identified and known.

SUMMARY OF THE INVENTION

The present invention is an improved apparatus for collecting and analyzing an airborne particulate radionuclide. The apparatus, Real-Time Airborne Radionuclide Analysis and Collection system (RTARAC), has a filter mounted in a housing, the housing having an air inlet upstream of the filter and an air outlet downstream of the filter, wherein an air stream flows therethrough. The air inlet receives the air stream, the filter collects the airborne particulate radionuclide and permits a filtered air stream to pass through the air outlet. The improvement which permits real time counting is a gamma detecting germanium diode mounted downstream of the filter in the filtered air stream. The gamma detecting germanium diode is spaced apart from a downstream side of the filter a minimum distance for a substantially maximum counting detection while permitting substantially free air flow through the filter and uniform particulate radionuclide deposition on the filter.

It is an object of the present invention to provide an improved apparatus for collection and analysis of an airborne particulate radionuclide permitting real time counting and analysis.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1A:
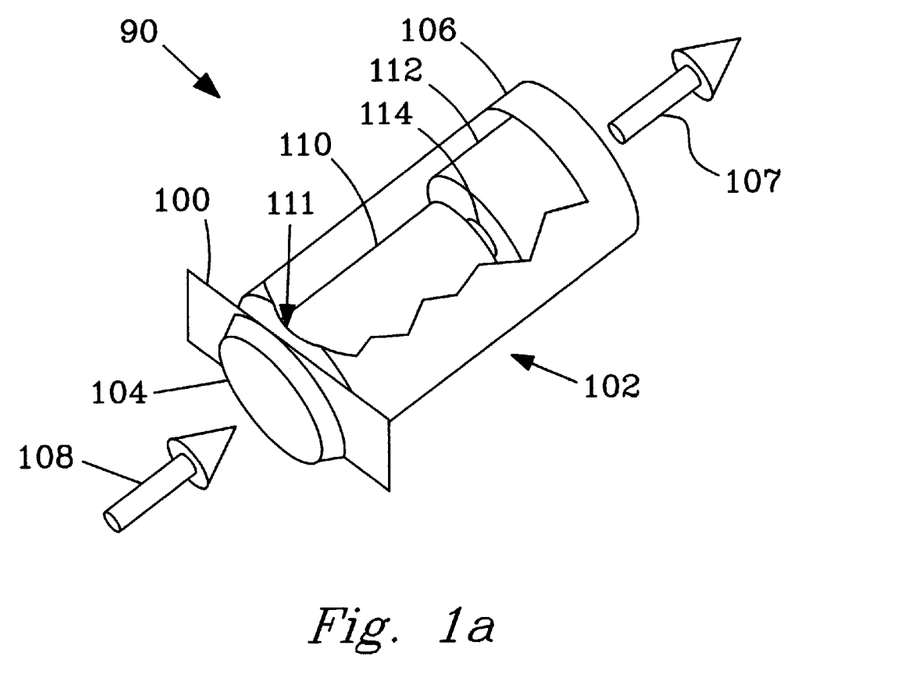
FIG. 1a is a cut-away of the apparatus of the present invention.

Referring to FIG. 1a, the apparatus 90 of the present invention, for collecting and analyzing an airborne particulate radionuclide in real time, has a filter 100 mounted in a housing 102. The housing 102 has an air inlet 104 upstream of the filter 100 and an air outlet 106 downstream of the filter 100, wherein an air stream 108 flows therethrough. The air inlet 104 receiving the air stream 108, the filter 100 collects airborne particulate radionuclide (not shown) and permits a filtered air stream 107 to pass through the air outlet 106. The improvement permitting real time counting of particulate radionuclide collected on the filter 100 is a germanium diode gamma detector 110 mounted downstream of the filter 100 in the filtered air stream 107. The germanium diode gamma detector 110 includes a germanium diode crystal and a pre-amplifier. Additionally, it may include a thermocouple for temperature control. The germanium diode gamma detector 110 has a detection face 111 that is spaced apart from a downstream side of the filter 100 a minimum distance for a substantially maximum counting detection while permitting substantially free air flow through the filter 100 and uniform particulate radionuclide deposition on the filter 100. A cooling unit 112 is used when ambient temperature is above liquid nitrogen temperature.

Figure 1B:
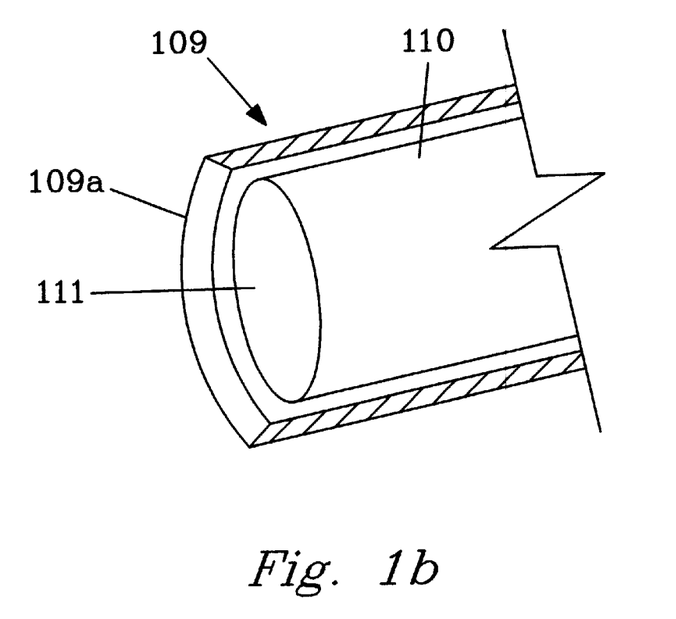
FIG. 1b is a cross section showing a shield around the detector.

Differentiating between natural airborne background species and low concentrations of characteristic anthropogenic induced species, e.g. nuclear proliferation effluents, requires the use of the detector 110 as part of a high resolution gamma detection system. The detector 110 is preferably a 140% high purity germanium diode, having a resolution of 2.02 keV FWHM at the $Co^{60}$ 1.332 MeV line thereby permitting rapid acquisition of low activity samples. Background radiation and physical noise reduction is also necessary for the RTARAC to detect low concentrations of particulate radionuclides on the filter 100. In FIG. 1b a shield 109 surrounding the detector 110 circumference reduces the background signal. The shield 109 is a high-Z material, for example tungsten, with a thickness of about 1 cm that reduces the background signal by about 60%. An 11.7 cm long by 11.2 cm inside diameter ×0.63 cm wall tungsten cylindrical shield 109 fits over the detector 110 centered thereover and extends beyond the detection face 111 of the detector 110 to effectively collimate radiation from the filter 100 and exclude radiation that does not come from the direction of the filter 100. In a preferred embodiment, the leading edge 109a of the shield 109 is beveled so that the leading edge is a knife edge and thickness increases to the thickness of the shield material away from the leading edge. The shield 109 may be an active shield (e.g. a scintillating plastic and/or an array of sodium iodide crystals) that switches off the electronics for the time that the external radiation is active above a predetermined threshold so that external radiation counts are excluded from the measurement.

The detector 110 measures approximately 83–88 mm in diameter by about 109 mm in length having a 1.5 mm dead layer. The detector 110 is preferably contained within a thin-walled (1 mm thick) radiologically clean (does not add to background) can that serves to (1) protect against debris that might otherwise impact and/or damage the detector 110 and (2) maintain a vacuum condition around the detector 110. The thin-walled can may be the shield or separate from the shield. Preferably the can is aluminum and the shield surrounds the can. The aluminum can, plus associated electronics, may be purchased commercially from several sources including but not limited to EG&G ORTEC, Canberra, Princeton Gamma-Tech, and KEVEX. The diode 110 is placed less than 2 cm behind the collection filter, for detecting gamma-rays emitted from the collected particulates.

The detector 110 must be kept at a temperature at or below about −73° C. by a cooling unit 112 which may be liquid nitrogen, frozen propane or a mechanical cryocooler, for example a stirling crycooler. A preferred design is to provide a themal conductor or cold finger 114 (preferably copper) that transfers thermal energy from the detector 110 through the cold finger to the cooling medium.

When mounted on a vehicle, for example an aircraft, it is necessary that the gamma detecting germanium detector 110 be isolated from mechanical noise and vibration. Specifically, a P-3 wing pod configuration places the apparatus within 3–4 meters of a 4500 horsepower turboprop engine. Vibration and microphonic signals are minimized with damping or attenuation material. The detector 110 and cooling medium are wrapped with a damping material, preferably Sorbathane sound damping rubber to a thickness of at least about 3 mm. The entire apparatus is further mounted to a vehicle structural frame with vibration damping rubber-potted mounts. A rubber sealing also prevents exposure of electrical components to moisture.

Figure 2A:
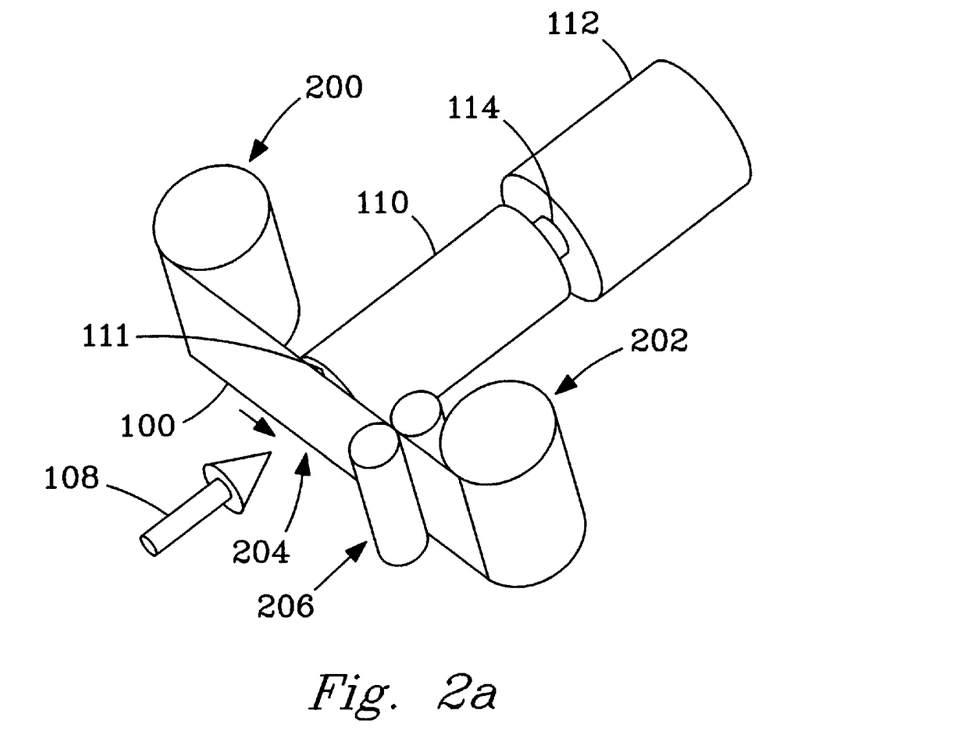
FIG. 2a is an isometric view of a roll feed filter advancer.
Figure 2B:
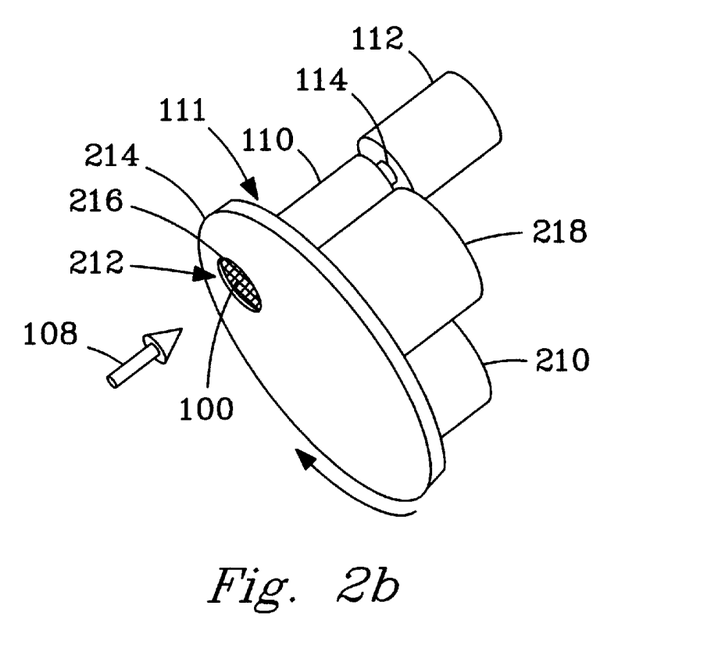
FIG. 2b is an isometric view of a moving cartridge filter advancer.

In order to obtain multiple real time samples, a filter advancer is used. Two types of filter advancer are shown in FIG. 2a and FIG. 2b. The filter advancer in FIG. 2a is a scroll filter advancer. The scroll filter advancer has first and second rolls 200, 202 with the filter 100 rolled thereon. The rolls are spaced apart forming a web 204 of the filter 100 therebetween. Additional rollers 206 permit application of a sealing laminate to preserve the filter 100.

The filter advancer in FIG. 2b is a moving cartridge filter advancer. The cartridge filter advancer has at least one magazine 210 holding at least one filter element 212. The magazine 210 cooperates with a shutter 214 having an opening 216 to receive the filter element 212. The circular shuttle mechanism including the shutter 214 rotates by a computer controlled servo motor (not shown) and advances individual filter elements 212 from the spring loaded supply magazine 210 into the sample air stream 108. When particulate collection is complete, the circular shuttle mechanism advances the filter element 212 to the unload position where it is archived in a storage magazine 218 for post flight examination and analysis. The circular shuttle mechanism repeats the load, sample, and unload sequence for each of the filter elements 212 in the supply magazine 210. A filter element 212 has two rings, preferably of machined aluminum, that bolt together and hold the circular filter media 100 and a stainless steel backup screen (not shown). This design allows using of a variety of filter media. The filter element 212 may also be construction as bonded or glued. The filter media 100 is preferably a matrix of permanently charged rectangular polypropylene fibers, for example the 3M Filtrete™ media.

Figure 3:
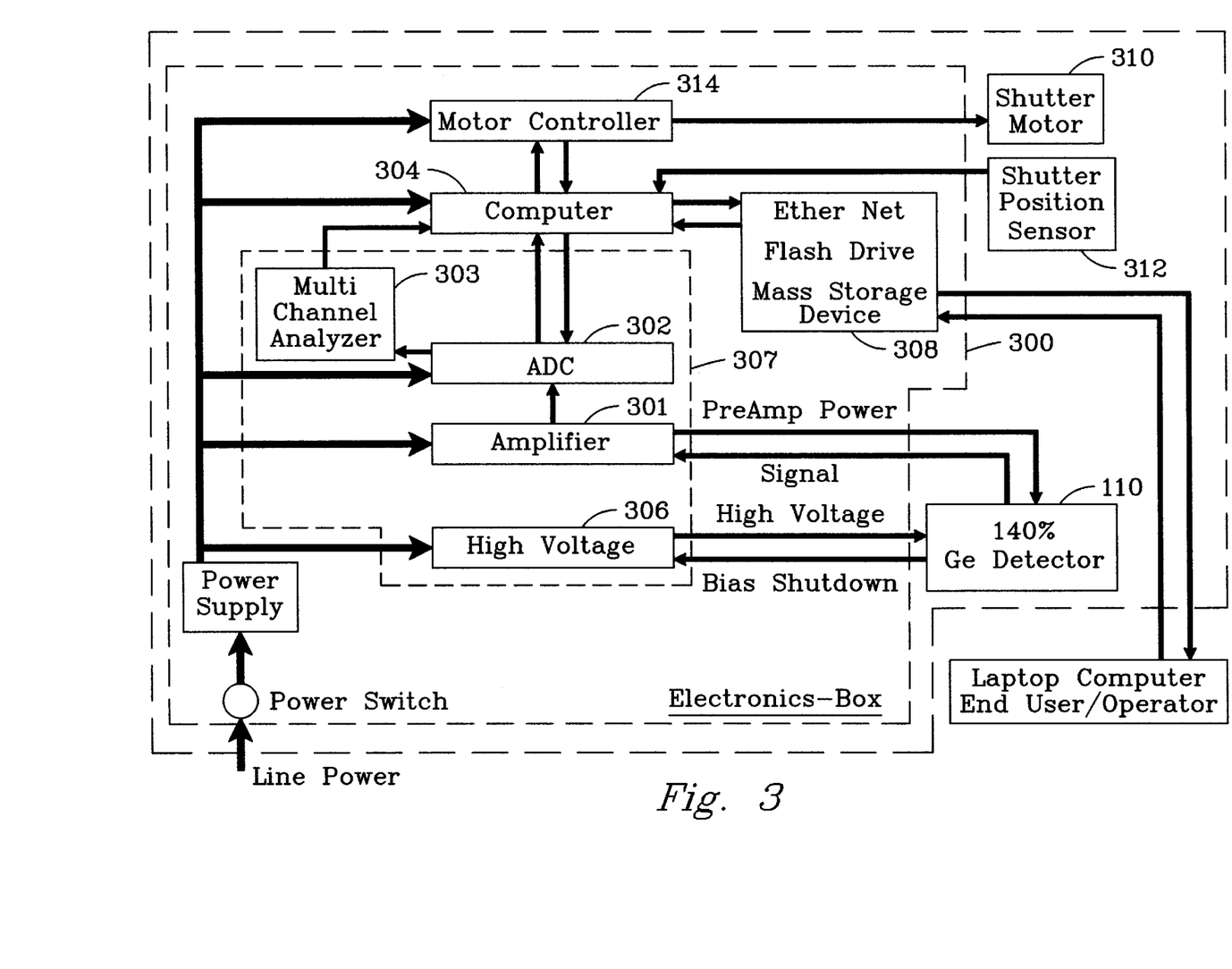
FIG. 3 is an electronic block diagram.

Electronics components 300 are shown in FIG. 3 Signals from the detector 110 are amplified 301 then analog to digital converted 302 for receipt by the multi-channel analyzer 303 that bins the digital signals by amplitude into a digital spectrum, and passes the digital spectrum to the computer 304. The multi-channel analyzer may be a card within the computer. Alternatively, the multi-channel analyzer may be external to the computer. A high voltage power supply 306 provides the bias voltage to the detector 110. A preferred embodiment uses a $M^3CA$ commercial component that includes the multi-channel analyzer 303, analog to digital converter 302, amplifier 301, and high voltage power supply 306 in a single unit 307. The computer 304 is preferably ruggedized and preferably comprises a 486 or PENTIUM® microprocessor (PENTIUM is a registered trademark of Intel Corporation) with a 20 Mb solid state hard drive and a solid state removable flash memory card. Optionally, the computer may be provided with accessories 308 including an Ethernet connection for external communication and control, as well as video card and keyboard port for direct user interface. For the moving cartridge filter advancer (FIG. 2b), a shuttle motor 310 and shuttle position sensor 312 (preferably an optical position sensor) are provided for the shutter 214 (FIG. 2b). Within the electronics components 300, a motor controller 314 is used. The motor controller 314 receives commands from the software and the user and sends appropriate signals to the shuttle motor 310. All electronics components 300 were tested and confirmed to make no electromagnetic interference to aircraft electronic systems. Conversely the electronics components 300 are substantially unaffected by aircraft electronic signals. The exception is foul weather radar which is seldom used in normal flight.

Figure 4:
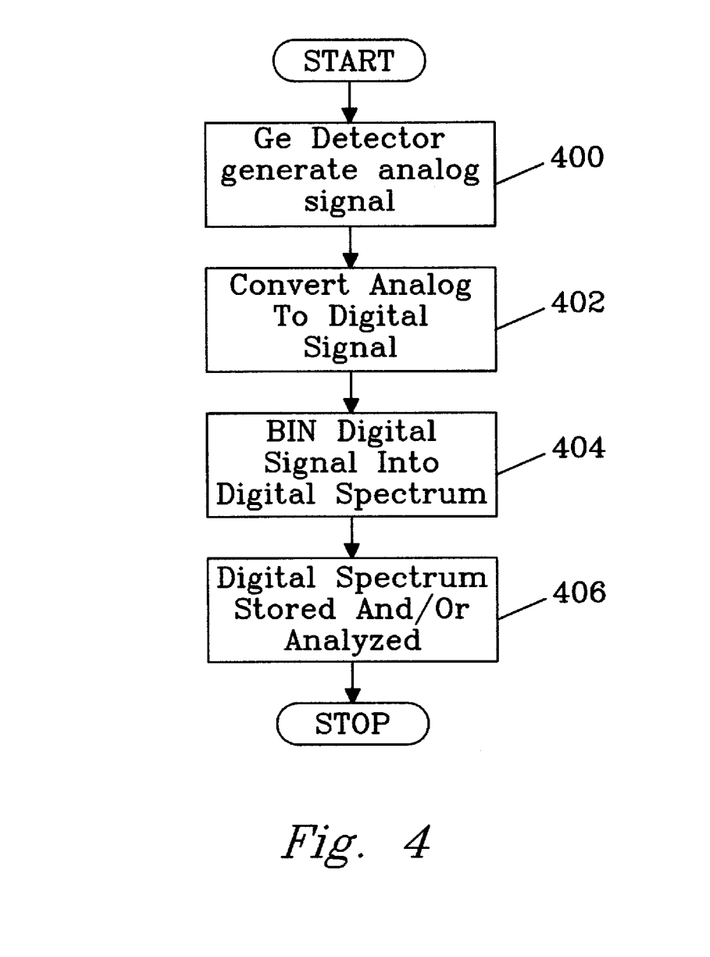
FIG. 4 is a flow chart for data collection.

Data collection flow chart is shown in FIG. 4. The germanium diode gamma detector (Ge detector) generates an analog signal 400 that is converted into a digital signal 402. The digital signal 402 is binned by amplitude into a digital spectrum 404 that is ready for analysis. The digital spectrum 404 may be stored and/or immediately analyzed 406. It is preferred that it is both stored and immediately analyzed 406.

Real time analysis is gamma ray spectrum analysis that may be accomplished with a variety of techniques including but not limited to (1) Radiation Detection and Measurement $2^{nd}$ edition, by Glenn F. Knoll, Copyright 1979, pages 672–678 "description of computerized spectrum analysis", (2) SAMPO analysis routine described in Computer Physics Communication, 24, 11 (1981), by M. J. Koskelo, P. A. Aarnio, and J. T. Routti, (3) GAUSS analysis routine described in Nuclear Instrumentation Methods, 206, 477 (1983), by R. G. Helmer, and C. M. McCullagh, (4) a commercially available analysis routine is the "MAESTRO" program distributed by EG&G Ortec, 100 Midland Road, Oak Ridge, Tenn. 37831-0895, and combinations thereof.

Figure 5:
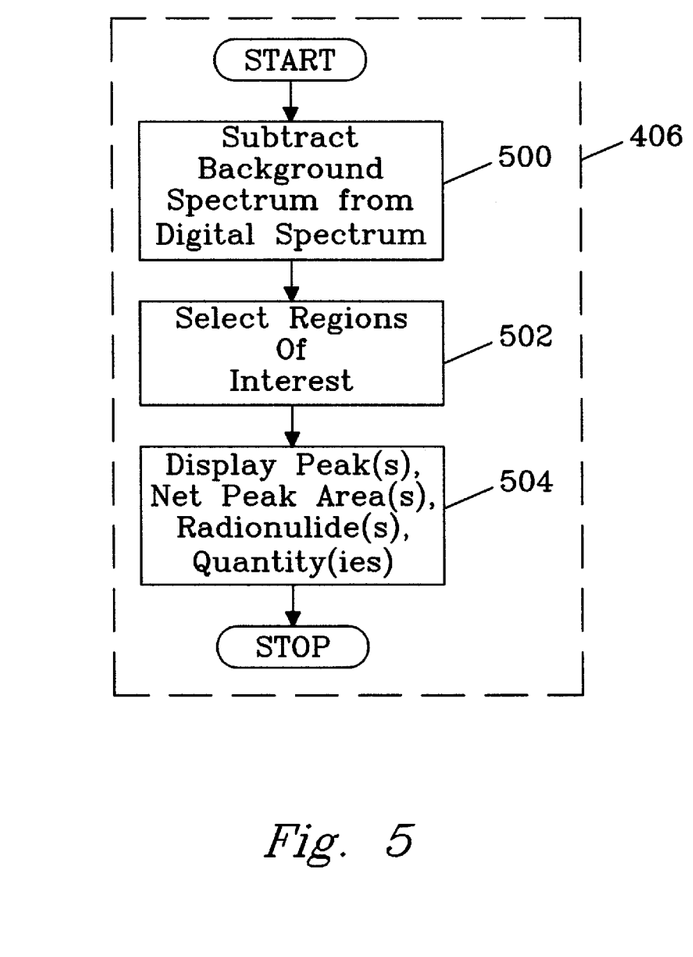
FIG. 5 is a flow chart for real time analysis.

A real time analysis for the present invention is shown in FIG. 5. The digital spectrum 404 is modified by subtracting a background spectrum 500. The background spectrum may be a background spectrum obtained immediately prior to obtaining the digital spectrum 404 or it may be one obtained much earlier in time, or a composite thereof. Either all, or regions of interest of the digital spectrum are selected 502 for peak identification. By selecting regions of interest characteristic of certain radionuclide(s), less computation time is needed, thereby making the analysis faster. This analysis is completed by displaying the net peak(s) and calculated value(s) of corresponding net peak area(s) from which quantity of radionuclide(s) is calculated 504.

Another analysis is a rate of change analysis wherein sequential spectra are compared for peak growth rate. Again, either the entire spectrum or regions of interest may be selected. Focusing on regions of interest for certain radionuclides reduces the computational load and speeds the results. Use of faster computers may reduce or eliminate the benefit of selecting regions of interest.

Because the background signal is variable in time and spatial location in the atmosphere, maximum signal is achieved by making sample collection period less than or equal to the time that the R-TARAC is in a plume. Thus, for a plume transit time of, for example, 5 minutes, the sampling period for each filter section or filter unit should be 5 minutes or less. For a dispersed plume and low radionuclide content and near the detection level, maximum signal is obtained by substantially matching sampling time to time in the plume.

During a typical mission, the RTARAC collects and stores an 8000 channel gamma spectrum every 2–30 seconds. These files are archived on a 20 Mbytes flash memory card and can be called up for future reference during or after the mission. At two-second intervals, a simple gamma analysis routine is run on the current acquisition spectrum. The results of this analysis are constantly updated and displayed on the operator screen. The operator can view the actual spectrum as it develops or can watch count rate and peak analysis displayed in a table of pre-defined characteristic radionuclides of interest. The user interface and analysis display are designed to provide the operator with a definite location and time that the aircraft encountered measurable quantities of specific radionuclides above background levels. In conjunction with GPS data input, the RTARAC program will map the flight path of the aircraft and place graphical markers in places where positive results were found. Using meteorological and wind data, an analyst can formulate the origin of an effluent plume for further investigation or predict its future path.

Figure 6A:
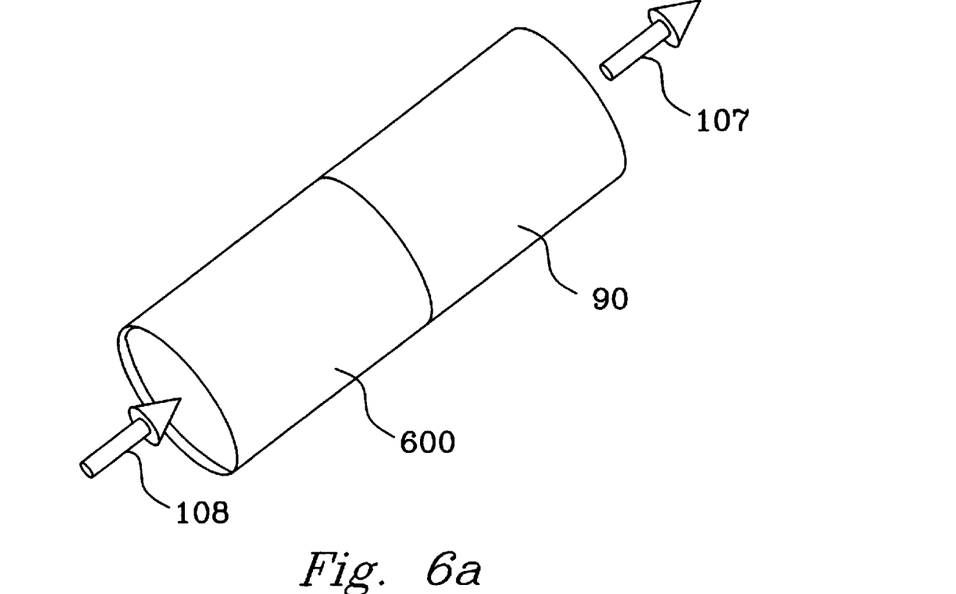
FIG. 6a is an embodiment of the present invention whereby the air stream is provided by a blower.
Figure 6B:
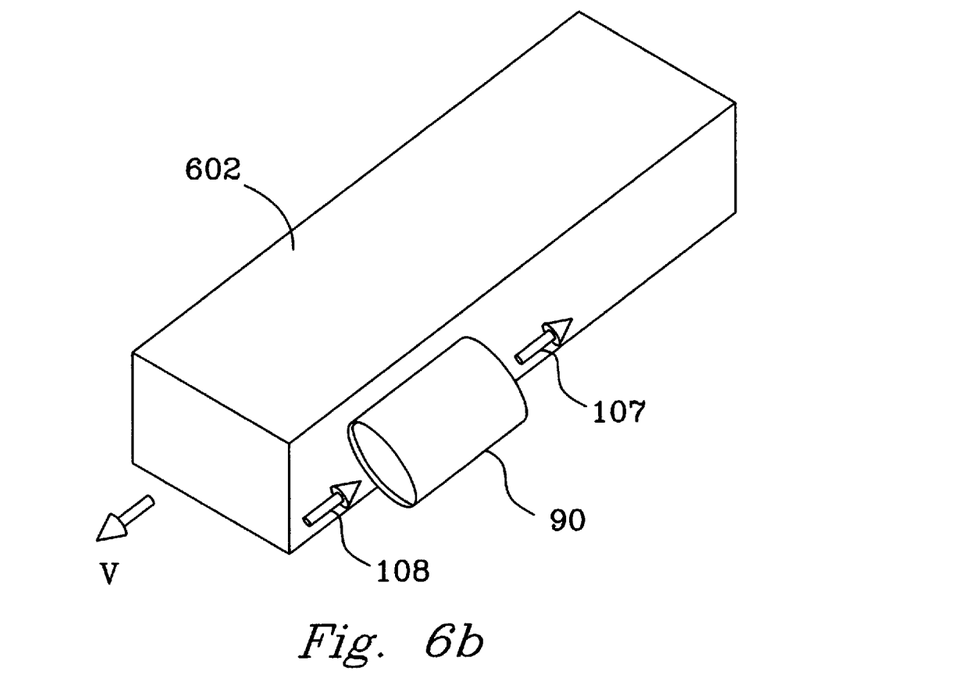
FIG. 6b is an embodiment of the present invention whereby the air stream is provided by a moving vehicle.

Although the apparatus 90 may be stationary with air moving through it, (e.g., the air stream 108 provided by a blower 600 as exemplified in FIG. 6a) it is preferred that the apparatus 90 be mounted on a vehicle 602 moving at a velocity V to produce the air stream 108, as exemplified in FIG. 6b, such as an airplane to achieve greater air flow volume through the apparatus 90. Mounted in wing pod of a long range aircraft like the P-3 Orion, or the C-130, the RTARAC can be deployed to remote locations yet still sample at altitudes between 60 and 9140 meters Above Ground Level (AGL). The wing pod mounting eliminates the need for dedicated aircraft giving the user deployment flexibility and reduced costs. The pod position also permits the collection of undisturbed air and reduces the risk of losing particulates through turbulent or static deposition on the aircraft body. Air is directed through the intake by the forward motion of the aircraft. The intake is preferably about 15 cm diameter. The aircraft cruises at a velocity of about 410 km/hr resulting in an air sampling rate of about 20 $m^3$ per minute. This volume is directly measured with an RTD anemometer calibrated to ground based velocity experiments and verified by pressure differential tests.

EXAMPLE 1

An experiment was conducted to demonstrate the apparatus of the present invention. The RTARAC system was first tested on the ground with the assistance of a 15 horsepower Roots Blower air pump. This unit provided adequate simulation of in flight airflow to test the mechanical function of the RTARAC. Nearly 200 successful filter advances were achieved without any failures.

In addition, particulate collection efficiencies were confirmed for background radionuclides by comparing Filtrete™ with micro pore filter collections. Efficiencies of 60% or greater were found for particle sizes of 0.1 $\mu$m and larger at a face velocity of 15 meters per second.

Ground tests also showed that cross contamination between filters within the archive magazine was un-measurable.

EXAMPLE 2

Experiments were conducted to demonstrate the present invention mounted on aircraft. The first flight tests were carried out on a twin turboprop, 18 passenger Grumman Gulfstream (G-1). The RTARAC was mounted in the empty fuselage of the G-1. Intake and exhaust ducts transported air through a modified window port to the RTARAC. The G-1 provided an inexpensive platform for initial flight testing and background collections. The RTARAC performed well, collecting distinct high resolution background spectra and successfully advancing and archiving all eleven filter cartridges on two three hour flights.

Expected decreases in radon daughter concentrations with increasing collection altitude were recorded. Collection elevations ranged from 150 to 6710 meters above ground level. Resolution and gain on the detector were both stable during the G-1 tests.

The RTARAC was mounted in an airborne multistage pod system effluent species identification (AMPS ESI) pod and flown over various portions of the continental U.S. with the Naval Research Laboratory (NRL) P-3 Orion test platform. Over the course of ten flights and eight collection missions, operators proved the physical performance of the RTARAC in extreme flight conditions. During mission eight, a variety of flight conditions were encountered. Forces due to turning, climbing, descending, bouncing and vibration were all experienced through their normal ranges. Mechanical cycling of the RTARAC filter changing system did not impact its performance. It was 100% effective during all modes of flight and through many combinations. The temperature of the pod exterior would often change dramatically and rapidly during accent and decent. These changes had no observed effect on the mechanical operation of the RTARAC. High humidity was also experienced after descending from low temperature high altitude flight. Problems associated with condensation buildup were not realized. Post flight inspection showed that the instrument was covered with water, but no adverse effects were observed.

During each flight, eleven filter cartridges were cycled through the system. Since only background collections were expected, spectra files were only saved at a rate of one every two minutes during each of the five-hour flights. Collection elevations ranged from 150 to 3050 meters AGL. As with the G-1 test flights, only background radionuclides were found. Stable gain and resolution during the P-3 flights, however, proved the design of the RTARAC vibration isolation methods and the general quality of the design.

Figure 7:
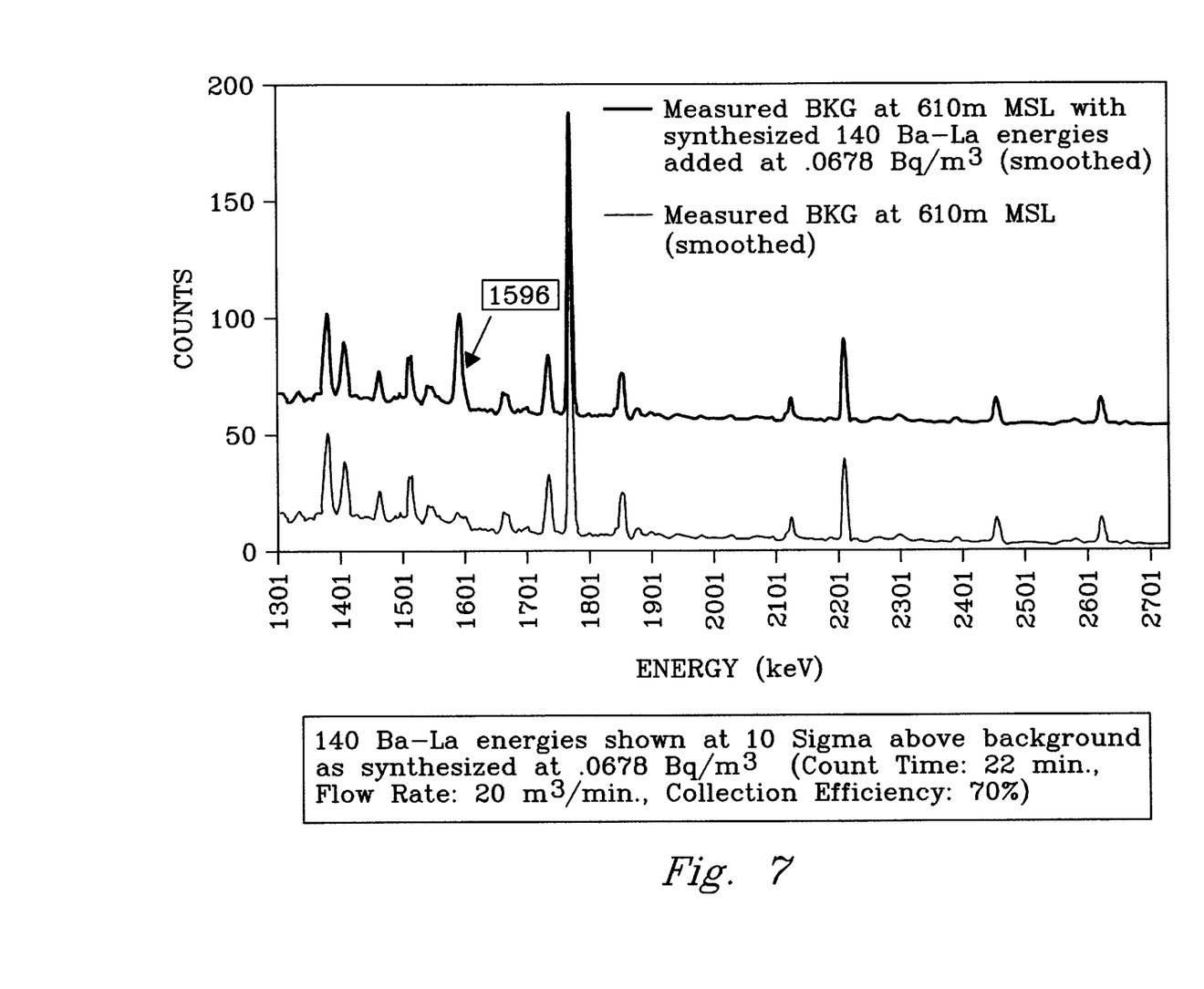
FIG. 7 is spectra of natural background and 140 Ba—La.
Figure 10:
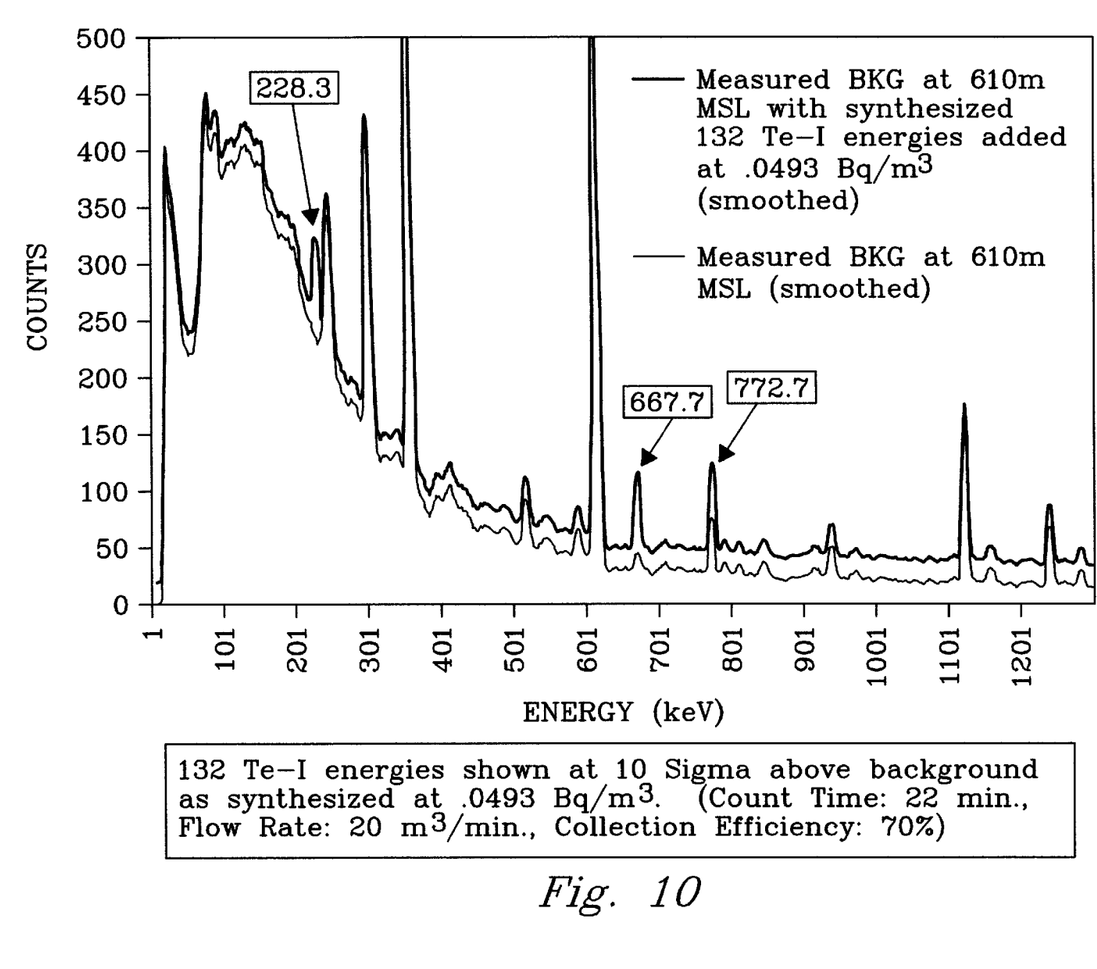
FIG. 10 is spectra of natural background and 132 Te—I.
Figure 11:
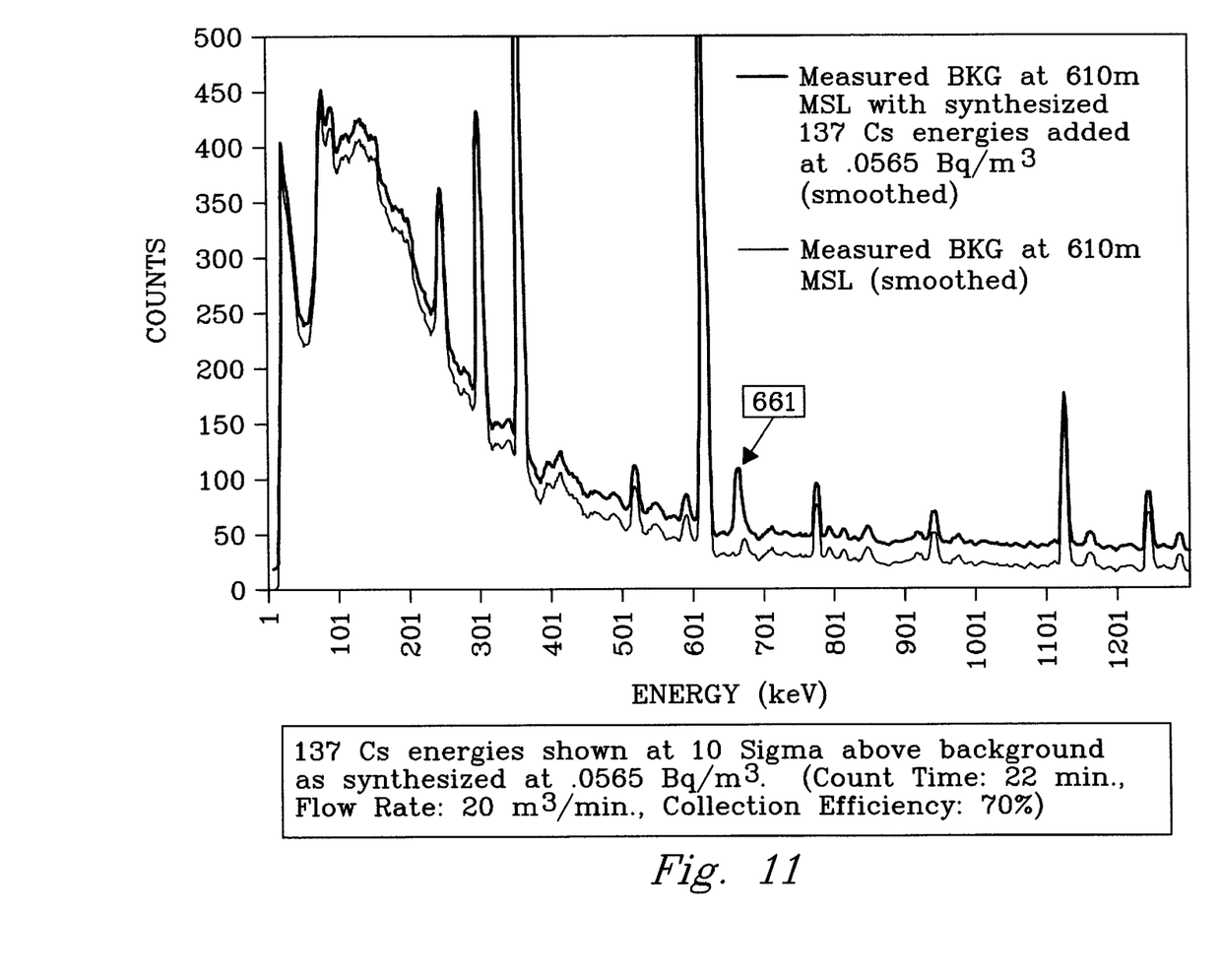
FIG. 11 is spectra of natural background and 137 Cs.

Results are shown in FIGS. 7, 11. Synthesized at a selected atmospheric concentration the radionuclide peaks are measured at 10 sigma above background. Radionuclide peaks and natural background spectra are offset by 20 counts and smoothed for visual clarity. $^{138}$Cs, $^{89}$Rb, $^{139}$Ba-$^{139}$Cs, $^{140}$Ba-$^{140}$La and other characteristic radionuclides were measured at concentrations in the range of $10^{-2}$ to $10^{-1}$ Bq/M$^3$ with similar certainty. The 10 sigma sensitivities indicated in FIG's 7–11 are those which are possible based on a 22-minute continuous sampling and analysis period during an aircraft flight at about 610 meters above ground level. If a 5 sigma precision were desired, then data collected in about ⅓ of the 22-minute time would have approximately ⅓ of the detection sensitivity of the 10 sigma data.

In FIG. 7 a gamma ray spectrum of Ba-140/La-140 is superimposed on the natural background. In this case, the La-140 photopeak at 1596 keV provided the best measure of Ba-140/La-140. This energy was relatively unique and background interferences were comparatively small although there is some interference from a Rn-220 daughter (TI-208), 2615 keV double escape peak.

Figure 8:
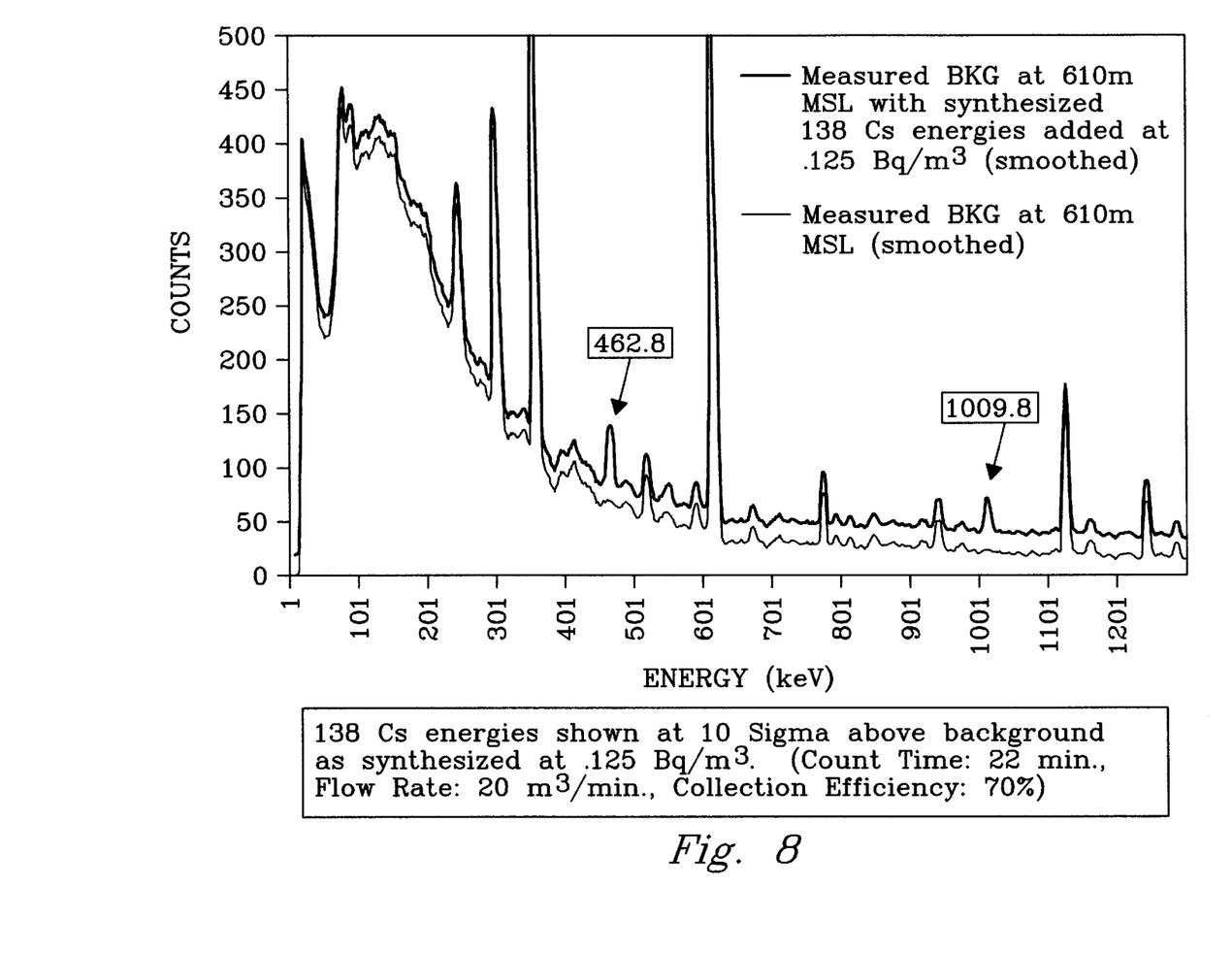
FIG. 8 is spectra of natural background and 138 Cs.

In FIG. 8 a gamma ray spectrum of Cs-138 is superimposed on the natural background. Two prominent photopeaks are indicated at 462.8 and 1009.8 keV which may identify and measure this radionuclide.

Figure 9:
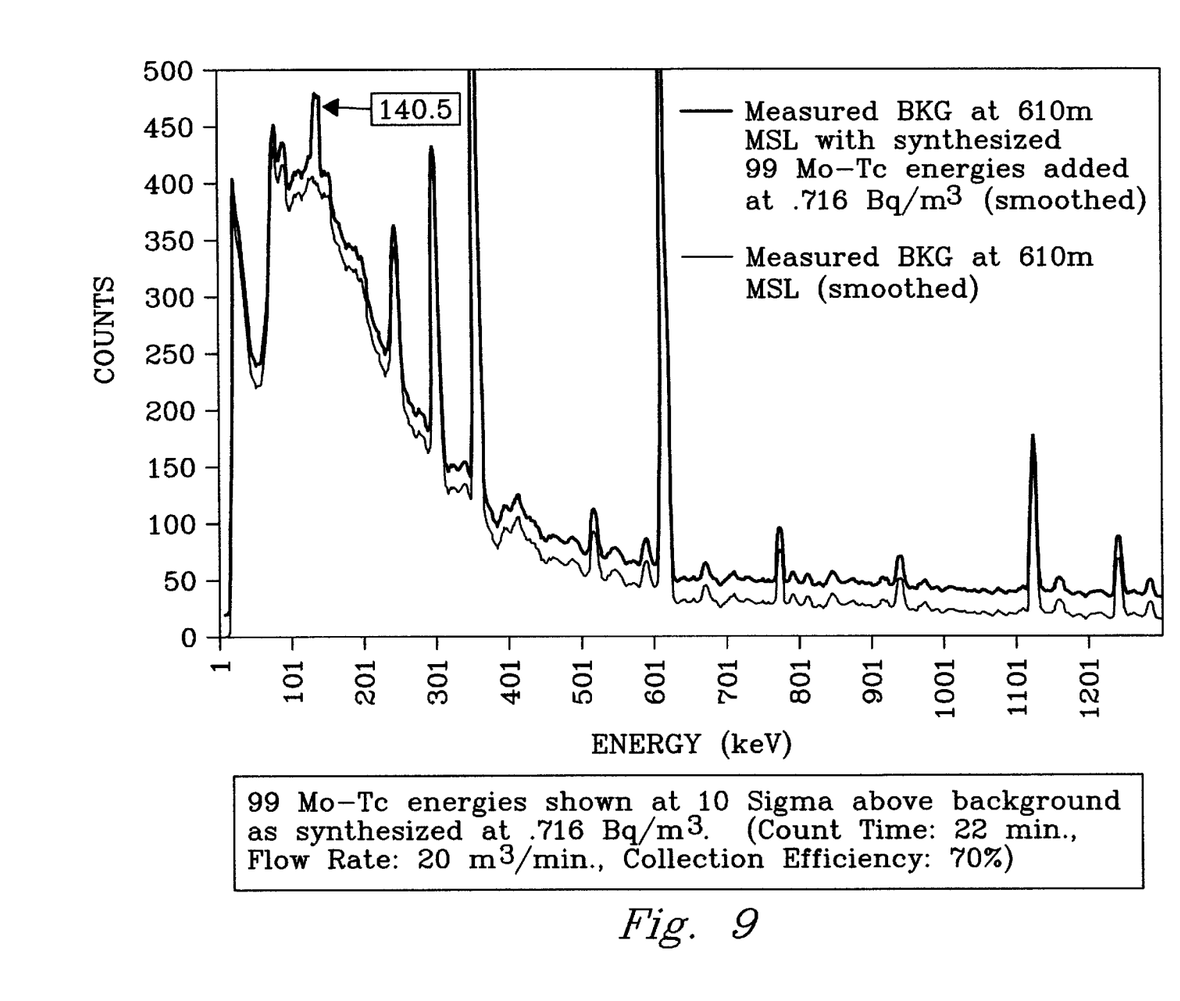
FIG. 9 is spectra of natural background and 99 Mo—Tc.

In FIG. 9 a gamma ray spectrum of Mo-99(Tc-99) is superimposed on the natural background. The major photo emission associated with its decay is 140.5 keV.

In FIG. 10 a gamma ray spectrum of Te-132/I-132 is superimposed on the natural background. Its photopeaks are readily observed above the natural background and has no noble gas precursors.

In FIG. 11, the gamma ray spectrum of Cs-137/Ba-137 is superimposed on the natural background. The decay of Cs-137/Ba-137 results in emission of a 661 keV photon that is easily distinguished from the background spectrum.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for collecting and analyzing an airborne particulate radionuclide, the apparatus having a filter mounted in a housing, said housing having an air inlet upstream of the filter and an air outlet downstream of the filter, wherein an air stream flows therethrough, the air inlet receiving the air stream, the filter collecting airborne particulate radionuclide and permitting a filtered air stream to pass through the air outlet, wherein the improvement comprises:
    (a) a germanium diode gamma detector mounted downstream of the filter in the filtered air stream, and having a detection face spaced apart from a downstream side of the filter a minimum distance for a substantially maximum counting detection while permitting substantially free air flow through the filter and uniform particulate radionuclide deposition on the filter; wherein
    (b) said air stream is provided by a moving vehicle with said apparatus mounted thereon.

2. The apparatus as recited in claim 1, further comprising a filter advancer.

3. The apparatus as recited in claim 2, wherein said filter advancer is a cartridge holding at least one filter element, the cartridge cooperating with a shutter having an opening to receive said at least one filter element.

4. The apparatus as recited in claim 2, wherein said filter advancer is a scroll having first and second rolls with the filter rolled thereon, said rolls spaced apart forming a web of the filter therebetween.

5. The apparatus as recited in claim 1, further comprising a filter archiver permitting a post collection analysis of the filter and preventing cross contamination of filter portions.

6. The apparatus as recited in claim 5, wherein said filter archiver is a cartridge for receiving a filter element.

7. The apparatus as recited in claim 5, wherein said filter archiver is a laminator for covering a filter element with a protective cover.

8. The apparatus as recited in claim 1 further comprising a shield surrounding a circumference of the germanium diode gamma detector.

9. The apparatus as recited in claim 8, wherein said shield extends beyond said detection face toward said filter.

10. A method for collecting and analyzing an airborne particulate radionuclide, comprising the steps of mounting a filter in a housing, said housing having an air inlet upstream of the filter and an air outlet downstream of the filter, flowing an air stream therethrough, the air inlet receiving the air stream, the filter collecting airborne particulate radionuclide and permitting a filtered air stream to pass through the air outlet, wherein the improvement comprises:
    (a) mounting a germanium diode gamma detector downstream of the filter in the filtered air stream, and having a detection face spaced apart from a downstream side of the filter a minimum distance for a substantially maximum counting detection while permitting substantially free air flow through the filter and uniform particulate radionuclide deposition on the filter; wherein
    (b) said air stream is provided by a moving vehicle with said housing and germanium diode gamma detector mounted thereon.

11. The method as recited in claim 10, further comprising advancing the filter.

12. The method as recited in claim 11, wherein advancing said filter comprises the steps of holding at least one filter element in a cartridge, the cartridge cooperating with a shutter having an opening receiving said at least one filter element.

13. The method as recited in claim 11, wherein advancing said filter is by rolling a scroll having first and second rolls with the filter rolled thereon, said rolls spaced apart forming a web of the filter therebetween.

14. The method as recited in claim 10, further comprising the step of archiving a filter permitting a post collection analysis of the filter and preventing cross contamination of filter portions.

15. The method as recited in claim 14, wherein said archiving is placing the filter into a cartridge for receiving the filter.

16. The method as recited in claim 14, wherein said archiving is laminating the filter element within a protective cover.

17. The method as recited in claim 10 further comprising surrounding a circumference of the germanium diode gamma detector with a shield.

18. The method as recited in claim 17, wherein said shield extends beyond said detection face toward said filter.

19. An apparatus for collecting and analyzing an airborne particulate radionuclide, comprising:

(a) a germanium diode gamma detector mounted in an air stream within a housing, said housing having an air inlet upstream of said detector and an air outlet downstream of said detector, wherein said air stream flows therethrough; and (b) a filter mounted in said housing upstream from said detector, said filter collecting airborne particulate radionuclide and permitting a filtered air stream to pass through said air outlet, said filter spaced apart from a detection face of said detector a minimum distance for a substantially maximum counting detection while permitting substantially free air flow through said filter and uniform particulate radionuclide deposition on said filter.

20. The apparatus as recited in claim 19, further comprising a filter advancer.

21. The apparatus as recited in claim 20, wherein said filter advancer is a cartridge holding at least one filter element, the cartridge cooperating with a shutter having an opening to receive said at least one filter element.

22. The apparatus as recited in claim 20, wherein said filter advancer is a scroll having first and second rolls with the filter rolled thereon, said rolls spaced apart forming a web of the filter therebetween.

23. The apparatus as recited in claim 19, further comprising a filter archiver permitting a post collection analysis of the filter and preventing cross contamination of filter portions.

24. The apparatus as recited in claim 23, wherein said filter archiver is a cartridge for receiving a filter element.

25. The apparatus as recited in claim 23, wherein said filter archiver is a laminator for covering a filter element with a protective cover.

26. The apparatus as recited in claim 19, wherein said air stream is provided by a blower.

27. The apparatus as recited in claim 19, wherein said air stream is provided by a moving vehicle with said apparatus mounted thereon.

28. The apparatus as recited in claim 19, further comprising a shield surrounding a circumference of the germanium diode gamma detector.

29. The apparatus as recited in claim 28, wherein said shield extends beyond said detection face toward said filter.

30. A method for collecting and analyzing an airborne particulate radionuclide, comprising the steps of:

(a) mounting a germanium diode gamma detector in an air stream within a housing, said housing having an air inlet upstream of said detector and an air outlet downstream of said detector, flowing said air stream therethrough; and (b) mounting a filter in said housing upstream from said detector, said filter collecting airborne particulate radionuclide and permitting a filtered air stream to pass through said air outlet, said filter spaced apart from a detection face of said detector a minimum distance for a substantially maximum counting detection while permitting substantially free air flow through said filter and uniform particulate radionuclide deposition on said filter.

31. The method as recited in claim 30, further comprising advancing said filter.

32. The method as recited in claim 31, wherein advancing said filter comprises the steps of holding at least one filter element in a cartridge, the cartridge cooperating with a shutter having an opening receiving said at least one filter element.

33. The method as recited in claim 31, wherein advancing said filter is by rolling a scroll having first and second rolls with the filter rolled thereon, said rolls spaced apart forming a web of the filter therebetween.

34. The method as recited in claim 31, further comprising the step of archiving a filter permitting a post collection analysis of said filter and preventing cross contamination of filter portions.

35. The method as recited in claim 34, wherein said archiving is placing said filter into a cartridge for receiving said filter.

36. The method as recited in claim 34, wherein said archiving is laminating the filter element within a protective cover.

37. The method as recited in claim 30, wherein said air stream is provided by moving a vehicle with said housing and germanium diode gamma detector mounted thereon.

38. The method as recited in claim 30, further comprising surrounding a circumference of the germanium diode gamma detector with a shield.

39. The method as recited in claim 38, wherein said shield extends beyond said detection face toward said filter.

* * * * *